United States Patent
Takagi et al.

(10) Patent No.: US 9,209,701 B2
(45) Date of Patent: Dec. 8, 2015

(54) ELECTRIC POWER CONVERSION SYSTEM

(71) Applicants: Kenichi Takagi, Nagoya (JP); Masanori Ishigaki, Nagakute (JP); Takaji Umeno, Nisshin (JP); Kenichiro Nagashita, Toyota (JP); Takahiro Hirano, Toyota (JP); Jun Muto, Toyota (JP); Yasuharu Terada, Toyota (JP)

(72) Inventors: Kenichi Takagi, Nagoya (JP); Masanori Ishigaki, Nagakute (JP); Takaji Umeno, Nisshin (JP); Kenichiro Nagashita, Toyota (JP); Takahiro Hirano, Toyota (JP); Jun Muto, Toyota (JP); Yasuharu Terada, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 89 days.

(21) Appl. No.: 14/186,037

(22) Filed: Feb. 21, 2014

(65) Prior Publication Data

US 2014/0254209 A1    Sep. 11, 2014

(30) Foreign Application Priority Data

Mar. 8, 2013  (JP) .................. 2013-046572

(51) Int. Cl.
*H02M 3/335* (2006.01)

(52) U.S. Cl.
CPC ...... *H02M 3/33546* (2013.01); *H02M 3/33584* (2013.01)

(58) Field of Classification Search
CPC ... H02M 3/285; H02M 3/33584; H02M 1/10; H02J 1/08; H02J 2001/008; B60R 25/00
USPC ......... 363/16, 17, 21.01, 21.08, 21.12, 21.18, 363/66, 67, 69, 71, 127, 132; 307/39, 43, 307/50, 80, 82
See application file for complete search history.

(56) References Cited

U.S. PATENT DOCUMENTS

| | | | |
|---|---|---|---|
| 6,876,556 B2 * | 4/2005 | Zhu et al. ................. | 363/17 |
| 7,202,810 B2 * | 4/2007 | Mitsumoto ............... | 342/70 |
| 7,408,794 B2 | 8/2008 | Su | |
| 7,433,207 B2 * | 10/2008 | Thor et al. ............... | 363/17 |
| 7,638,904 B2 * | 12/2009 | Shoji et al. .............. | 307/154 |
| 8,085,557 B2 * | 12/2011 | Ito et al. .................. | 363/17 |
| 2006/0139823 A1 | 6/2006 | Shoji et al. | |
| 2011/0198933 A1 | 8/2011 | Ishigaki et al. | |

(Continued)

FOREIGN PATENT DOCUMENTS

| | | | |
|---|---|---|---|
| JP | 2006-187147 A | 7/2006 | |
| JP | 2011-193713 A | 9/2011 | |
| JP | 2011-234541 A | 11/2011 | |

(Continued)

*Primary Examiner* — Rajnikant Patel
(74) *Attorney, Agent, or Firm* — Dinsmore & Shohl LLP

(57) ABSTRACT

An electric power conversion system includes: a primary electric power conversion circuit including primary right and left arms; a secondary electric power conversion circuit including secondary right and left arms; and a control circuit controlling transfer of electric power between the primary and secondary electric power conversion circuits by magnetically coupling a primary coil to a secondary coil. The control circuit sets an interphase difference in switching between right and left arm lower transistors in the primary electric power conversion circuit and an interphase difference in switching between right and left arm lower transistors in the secondary electric power conversion circuit on the basis of off times of the primary and secondary electric power conversion circuits such that a phase difference between terminal voltage waveforms of the primary and secondary coils is 0 and duty ratios of the terminal voltage waveforms are equal to each other.

4 Claims, 3 Drawing Sheets

(56) References Cited

U.S. PATENT DOCUMENTS

2012/0020126 A1 1/2012 Moki
2013/0044519 A1 2/2013 Teraura et al.

FOREIGN PATENT DOCUMENTS

| JP | 2012-125040 A | 6/2012 |
| WO | 2010-114088 A1 | 10/2010 |

* cited by examiner

ELECTRIC POWER CONVERSION SYSTEM

INCORPORATION BY REFERENCE

The disclosure of Japanese Patent Application No. 2013-046572 filed on Mar. 8, 2013 including the specification, drawings and abstract is incorporated herein by reference in its entirety.

BACKGROUND OF THE INVENTION

1. Field of the Invention

The invention relates to an electric power conversion system and, more particularly, to an electric power conversion system that exchanges electric power between a primary electric power conversion circuit and a secondary electric power conversion circuit.

2. Description of Related Art

There has been developed an electric power conversion system that exchanges electric power between a primary electric power conversion circuit and a secondary electric power conversion circuit magnetically coupled to the primary electric power conversion circuit.

As a related technique of the invention, for example, U.S. Pat. No. 7,408,794 describes an electric power conversion circuit that includes three input/output ports and half-bridge circuits. A high-voltage inverter circuit, a 14V load and a 42V load are respectively connected to the three input/output ports of the electric power conversion circuit.

Japanese Patent Application Publication No. 2006-187147 (JP 2006-187147 A) describes an electric power conversion circuit that includes two input/output ports and full-bridge circuits. The electric power conversion circuit includes three reactors in addition to reactors that constitute a transformer. There is also disclosed that a high-voltage inverter and a low-voltage electronic device are respectively connected to the two input/output ports of the electric power conversion circuit.

In the above electric power conversion system, a power transfer direction and a power transfer amount are controlled by equalizing the terminal voltage waveform of a primary coil of the primary electric power conversion circuit to the terminal voltage waveform of a secondary coil of the secondary electric power conversion circuit and then adjusting a phase difference φ between the two voltage waveforms. However, if the primary electric power conversion circuit and the secondary electric power conversion circuit are caused to operate in a state where an off time δ1 of the primary electric power conversion circuit and an off time δ2 of the secondary electric power conversion circuit are different from each other, the relationship between the terminal voltage waveform of the primary coil and the terminal voltage waveform of the secondary coil collapses. Therefore, there is a possibility that transfer of electric power between the primary electric power conversion circuit and the secondary electric power conversion circuit cannot be controlled by adjusting the phase difference φ.

SUMMARY OF THE INVENTION (US)

The invention provides an electric power conversion system that allows transfer of electric power to be controlled with a phase difference φ even when the primary electric power conversion circuit and the secondary electric power conversion circuit are operated in a state where an off time δ1 of a primary electric power conversion circuit and an off time δ2 of a secondary electric power conversion circuit are different from each other.

An aspect of the invention provides an electric power conversion system. The electric power conversion system includes: a primary electric power conversion circuit including: a left arm including a left arm upper transistor and a left arm lower transistor connected in series with each other at a left arm connection point between a positive electrode bus and a negative electrode bus; a right arm including a right arm upper transistor and a right arm lower transistor connected in series with each other at a right arm connection point between the positive electrode bus and the negative electrode bus; and a primary coil connected and arranged between the left arm connection point and the right arm connection point; a secondary electric power conversion circuit configured similarly to the primary electric power conversion circuit and including a secondary coil corresponding to the primary coil; and a control circuit configured to control transfer of electric power between the primary electric power conversion circuit and the secondary electric power conversion circuit by magnetically coupling the primary coil to the secondary coil, wherein the control circuit is configured to set the interphase difference γ1 in switching between the left arm lower transistor and the right arm lower transistor in the primary electric power conversion circuit and the interphase difference γ2 in switching between the left arm lower transistor and the right arm lower transistor in the secondary electric power conversion circuit on the basis of an off time δ1 of the primary electric power conversion circuit and an off time δ2 of the secondary electric power conversion circuit such that a phase difference φ between a terminal voltage waveform of the primary coil and a terminal voltage waveform of the secondary coil is 0 and duty ratios of the terminal voltage waveforms are equal to each other when the off time of the left arm lower transistor is equal to the off time of the right arm lower transistor and the off time δ1 of the primary electric power conversion circuit is different from the off time δ2 of the secondary electric power conversion circuit.

With the electric power conversion system according to the above aspect, the interphase difference γ1 in switching between the left arm lower transistor and the right arm lower transistor in the primary electric power conversion circuit and the interface difference γ2 in switching between the left arm lower transistor and the right arm lower transistor in the secondary electric power conversion circuit are changed such that the phase difference between the terminal voltage waveform of the primary coil and the terminal voltage waveform of the secondary coil is 0 and the duty ratios of the terminal voltage waveforms are equal to each other. Thus, the terminal voltage waveform of the primary coil and the terminal voltage waveform of the secondary coil have the same shape. Thus, it is possible to control transfer of electric power with the phase difference φ even when the primary electric power conversion circuit and the secondary electric power conversion circuit are operated in a state where the off time δ1 of the primary electric power conversion circuit and the off time δ2 of the secondary electric power conversion circuit are different from each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
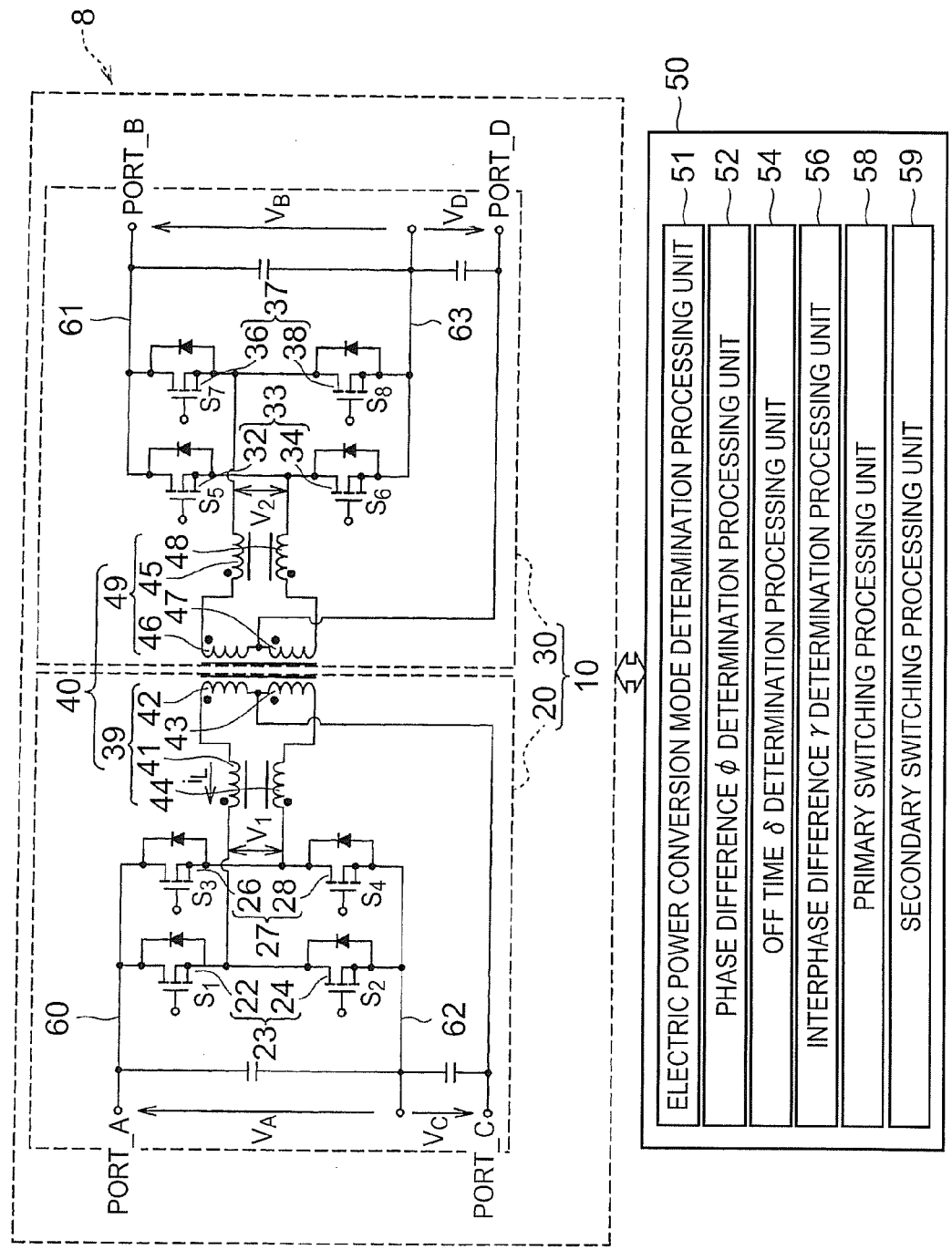
FIG. 1 is a view that shows an electric power conversion system according to an embodiment of the invention.

Hereinafter, an embodiment of the invention will be described in detail with reference to the accompanying drawings. Like reference numerals denote similar elements in all the drawings, and the overlap description is omitted below.

FIG. 1 is a view that shows an electric power conversion system 8. The electric power conversion system 8 is configured to include an electric power conversion device 10 and a control circuit 50. The electric power conversion device 10 has the function of selecting any two input/output ports from among four input/output ports and converting electric power between the selected two input/output ports. The electric power conversion device 10 is configured to include a primary electric power conversion circuit 20 and a secondary electric power conversion circuit 30. The primary electric power conversion circuit 20 and the secondary electric power conversion circuit 30 are magnetically coupled to each other by a transformation circuit 40.

A primary left arm 23 is connected between a primary positive electrode bus 60 and a primary negative electrode bus 62. The primary left arm 23 is formed by serially connecting a primary left arm upper transistor 22 and a primary left arm lower transistor 24. A primary right arm 27 is connected in parallel with the primary left arm 23 between a primary positive electrode bus 60 and a primary negative electrode bus 62. The primary right arm 27 is formed by serially connecting a primary right arm upper transistor 26 and a primary right arm lower transistor 28.

The input/output port A (PORT_A) is provided between the primary positive electrode bus 60 and the primary negative electrode bus 62. The input/output port C (PORT_C) is provided between the primary negative electrode bus 62 and a center tap that is a connection point between a coil 42 and a coil 43. The secondary electric power conversion circuit 30 is a circuit having a similar configuration to the primary electric power conversion circuit 20, and the detailed description is omitted. A load, a power supply, and the like, are connected to the input/output ports A, B, C, D.

The transformation circuit 40 includes a primary coil 39 and a secondary coil 49 magnetically coupled to the primary coil 39. The primary coil 39 is formed of serially connected coils 41 to 44. The secondary coil 49 is formed of serially connected coils 45 to 48.

Figure 2:
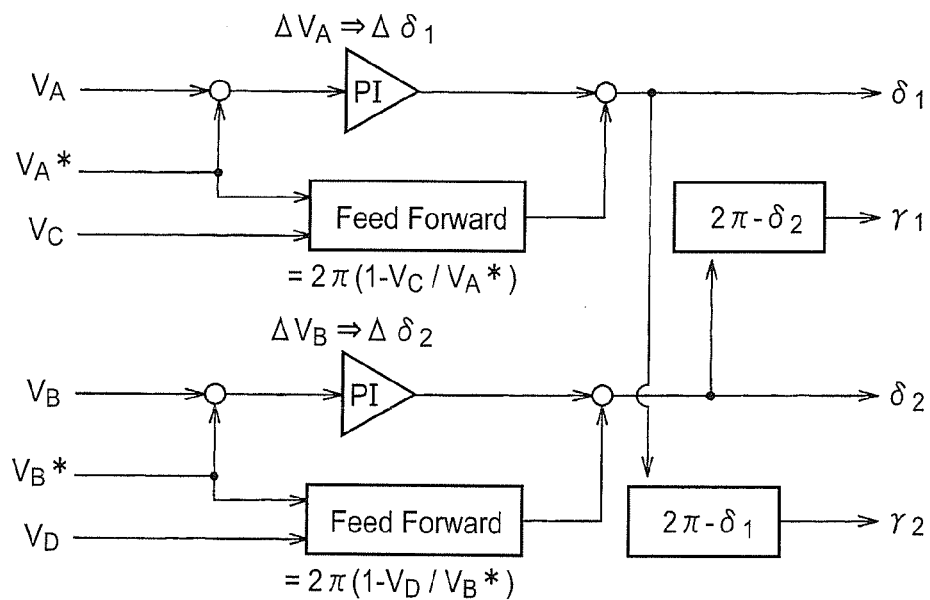
FIG. 2 is a block diagram of an off time δ determination processing unit and interphase difference γ determination processing unit of the electric power conversion system according to the embodiment of the invention.

The control circuit 50 has the function of setting parameters for controlling the overall electric power conversion device 10 and executing switching control over switching elements of the primary electric power conversion circuit 20 and secondary electric power conversion circuit 30. The control circuit 50 is configured to include an electric power conversion mode determination processing unit 51, a phase difference φ determination processing unit 52, an off time δ determination processing unit 54, an interphase difference γ determination processing unit 56, a primary switching processing unit 58 and a secondary switching processing unit 59. FIG. 2 is a block diagram of the off time δ determination processing unit 54 and interphase difference γ determination processing unit 56. The above functions may be implemented by executing software, and, specifically, may be implemented by executing an interphase difference adjustment program. Part of these functions may be implemented by hardware.

The electric power conversion mode determination processing unit 51 selects any two of the input/output ports A to D on the basis of an external signal (not shown), and sets an electric power conversion mode in which electric power is converted between the selected two input/output ports. One of the electric power conversion modes is a transfer mode in which electric power is bidirectionally transferred between the input/output port A and the input/output port B. Another one of the electric power conversion modes is a primary voltage step-up/step-down mode in which voltage is stepped up or stepped down between the input/output port A and the input/output port C. The other one of the electric power conversion modes is a secondary voltage step-up/step-down mode in which voltage is stepped up or stepped down between the input/output port B and the input/output port D.

The phase difference φ determination processing unit 52 has the function of setting a phase difference φ in the switching period of the switching elements between the primary electric power conversion circuit 20 and the secondary electric power conversion circuit 30 in order to cause the electric power conversion device 10 to function as a DC-DC converter circuit. The phase difference φ is a phase difference in voltage waveform between the terminal voltage V1 of the primary coil 39 and the terminal voltage V2 of the secondary coil 49. The function of the DC-DC converter circuit will be described later.

The off time δ determination processing unit 54 has the function of setting an off time δ of each of the switching elements of the primary electric power conversion circuit 20 and secondary electric power conversion circuit 30 in order to cause each of the primary electric power conversion circuit 20 and the secondary electric power conversion circuit 30 to function as a step-up/step-down circuit. The step-up/step-down circuit function of each of the primary electric power conversion circuit 20 and the secondary electric power conversion circuit 30 will be described later. As shown in FIG. 2, the off time δ determination processing unit 54 obtains δ1 by the addition of a value obtained by executing feedforward control over a command voltage value $V_A^*$ and a voltage value $V_C$ by using the relational expression $2\pi(1-V_C/V_A^*)$ and a value Δδ1 obtained by executing PI control based on a voltage value $V_A$. As shown in FIG. 2, the off time δ determination processing unit 54 obtains δ2 by the addition of a value obtained by executing feedforward control over a command voltage value $V_B^*$ and a voltage value $V_D$ by using the relational expression $2\pi(1-V_D/V_B^*)$ and a value Δδ2 obtained by executing PI control based on a voltage value $V_B$. Thus, even if there are fluctuations in load that is connected to the input/output port A or the input/output port B, δ1 or δ2 is calculated in consideration of the voltage value $V_A$ or the voltage value $V_B$, which has varied with the load fluctuations.

The interphase difference γ determination processing unit 56 has the function of setting an interphase difference γ1 of the primary electric power conversion circuit 20 and an interphase difference γ2 of the secondary electric power conversion circuit 30 such that the phase difference in voltage waveform between the terminal voltage V1 of the primary coil 39 and the terminal voltage V2 of the secondary coil 49 is 0 and the duty ratios of the voltage waveforms are equal to each other. Here, the interphase difference γ1 is a phase difference in switching control between the primary left arm lower transistor 24 and the primary right arm lower transistor 28. The interphase difference γ2 is a phase difference in switching control between a secondary left arm lower transistor 34 and a secondary right arm lower transistor 38. As shown in FIG. 2, the interphase difference γ determination processing unit 56 calculates the interphase difference γ1 by using the relational expression γ1=2π−δ2. As shown in FIG. 2, the interphase difference γ determination processing unit 56 calculates the interphase difference γ2 by using the relational expression γ2=2π−δ1.

The primary switching processing unit 58 has the function of executing switching control over the primary left arm upper transistor 22, the primary left arm lower transistor 24, the primary right arm upper transistor 26 and the primary right arm lower transistor 28 on the basis of outputs of the electric power conversion mode determination processing unit 51, phase difference ϕ determination processing unit 52, off time δ determination processing unit 54 and interphase difference γ determination processing unit 56.

The secondary switching processing unit 59, as well as the primary switching processing unit 58, has the function of executing switching control over a secondary left arm upper transistor 32, the secondary left arm lower transistor 34, a secondary right arm upper transistor 36 and the secondary right arm lower transistor 38.

Here, the step-up/step-down function of each of the primary electric power conversion circuit 20 and the secondary electric power conversion circuit 30 and the function of the electric power conversion device 10 as the DC-DC converter circuit will be described in detail. First, the step-up/step-down function of the primary electric power conversion circuit 20 will be described in detail. Focusing on the input/output port C and the input/output port A, the input/output port C is connected to a left arm connection point between the primary left arm upper transistor 22 and the primary left arm lower transistor 24 via the coils 41, 42 of the primary coil 39. Both ends of the primary left arm 23 are connected to the input/output port A, with the result that a step-up/step-down circuit is connected between the input/output port C and the input/output port A.

In addition, the input/output port C is connected to a right arm connection point between the primary right arm upper transistor 26 and the primary right arm lower transistor 28 via the coils 43, 44 of the primary coil 41. Both ends of the primary right arm 27 are connected to the input/output port A, with the result that a step-up/step-down circuit is connected between the input/output port C and the input/output port A. Thus, the two step-up/step-down circuits are connected in parallel with each other between the input/output port C and the input/output port A. The secondary electric power conversion circuit 30 is a circuit having a similar configuration to that of the primary electric power conversion circuit 20, with the result that two step-up/step-down circuits are connected in parallel with each other between the input/output port D and the input/output port B.

Next, the function of the electric power conversion device 10 as the DC-DC converter circuit will be described in detail. Focusing on the input/output port A and the input/output port B, the primary coil 39 is connected to the input/output port A, and the secondary coil 49 is connected to the input/output port B. The coils 42, 43 of the primary coil 39 and the coils 46, 47 of the secondary coil 49 are magnetically coupled to each other, thus functioning as the transformation circuit 40 (the center tap transformer having a winding number ratio of 1:N). Thus, by adjusting the phase difference ϕ of the switching period between the primary electric power conversion circuit 20 and the secondary electric power conversion circuit 30, it is possible to convert electric power input to the input/output port A and transfer the electric power to the input/output port B or convert electric power input to the input/output port B and transfer the electric power to the input/output port A. By changing the phase difference ϕ between V1 and V2, it is possible to adjust the amount and direction of electric power transferred between the primary electric power conversion circuit 20 and the secondary electric power conversion circuit 30. It is possible to transfer electric power from the primary electric power conversion circuit 20 to the secondary electric power conversion circuit 30 when V1 has an advanced phase; whereas it is possible to transfer electric power from the secondary electric power conversion circuit 30 to the primary electric power conversion circuit 20 when V2 has an advanced phase.

The operation of the thus configured electric power conversion system 8 will be described. The electric power conversion mode determination processing unit 51 that has received an external signal sets the electric power conversion mode of the electric power conversion device 10. The phase difference ϕ determination processing unit 52, the off time δ determination processing unit 54 and the interphase difference γ determination processing unit 56 that have received the set electric power conversion mode set the phase difference ϕ, the off times δ1, δ2 and the interphase differences γ1, γ2, respectively. The primary switching processing unit 58 and the secondary switching processing unit 59 execute switching control on the basis of the phase difference ϕ, the off times δ1, δ2 and the interphase differences γ1, γ2.

Figure 3:
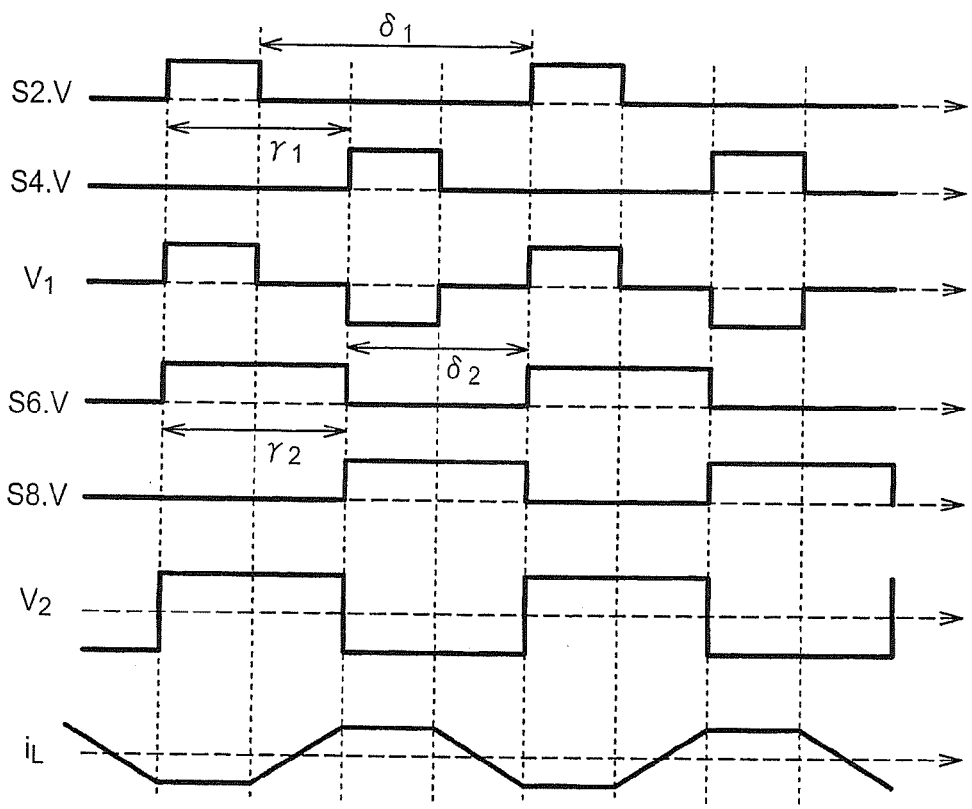
FIG. 3 is a timing chart that shows a variation in voltage and a variation in current in the electric power conversion system according to the embodiment of the invention.

Here, in order to make it easy to understand the advantageous effects of the electric power conversion system 8, the case where the phase difference ϕ is 0 and the interphase difference γ determination processing unit 56 sets the interphase differences γ1, γ2 to the same value without using the above-described relational expressions will be described with reference to FIG. 3. FIG. 3 is a timing chart that shows a variation in voltage and a variation in current where the abscissa axis represents time and the ordinate axis represents voltage or current value. As shown in FIG. 3, in the case where the values of the off times δ1, δ2 are different from each other and the interphase differences γ1, γ2 are the same value, the terminal voltage V1 of the primary coil 41 and the terminal voltage V2 of the secondary coil 42 have different voltage waveforms, and electric power is transferred between the primary electric power conversion circuit 20 and the secondary electric power conversion circuit 30 although the phase difference ϕ is 0. Therefore, it is not possible to execute transfer control by adjusting the phase difference ϕ. This is the challenge to be solved by the invention.

Figure 4:
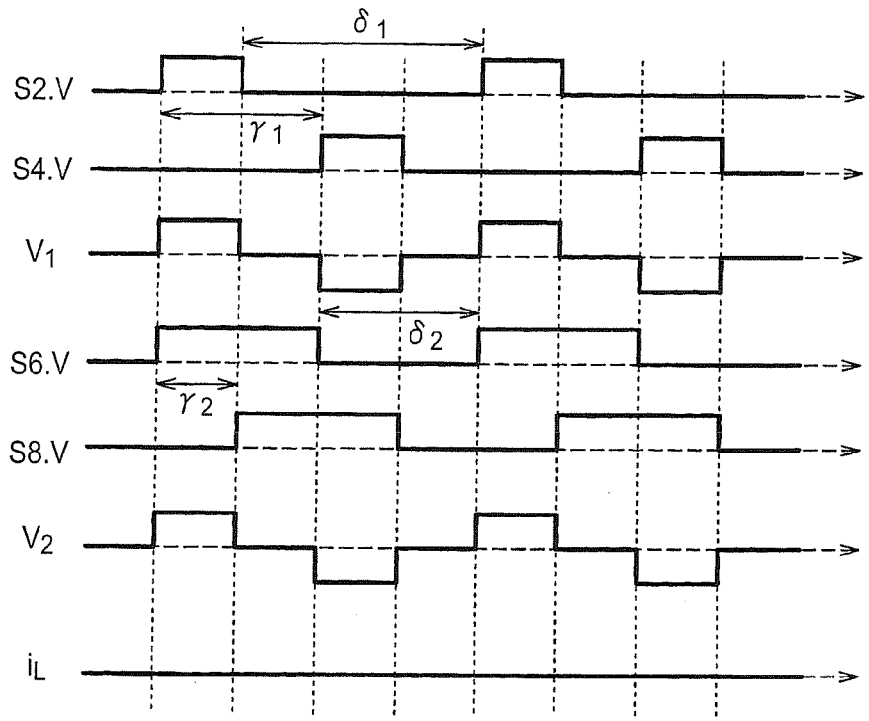
FIG. 4 is a timing chart that shows a variation in voltage and a variation in current in the electric power conversion system according to the embodiment of the invention.
Figure 5:
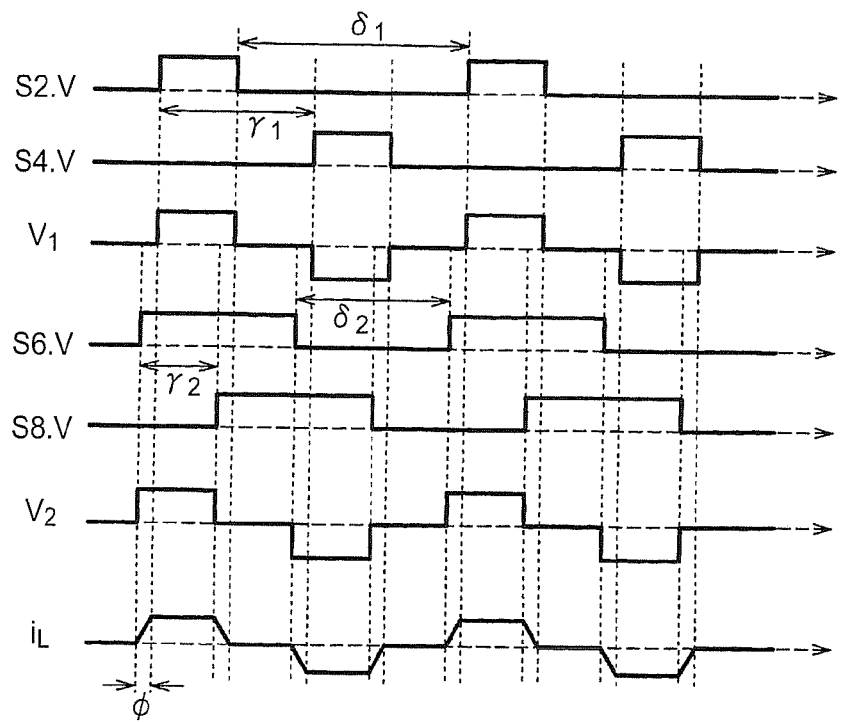
FIG. 5 is a timing chart that shows a variation in voltage and a variation in current in the electric power conversion system according to the embodiment of the invention.

Next, the case where the phase difference ϕ is 0 and the interphase difference γ determination processing unit 56 sets the interphase differences γ1, γ2 to the same value by using the above-described relational expressions will be described with reference to FIG. 4. FIG. 4 is a timing chart that shows a variation in voltage and a variation in current where the abscissa axis represents time and the ordinate axis represents voltage or current value. With the electric power conversion system 8, the interphase difference γ1 is calculated by using the relational expression 2π−δ2, and the interphase difference γ2 is calculated by using the relational expression 2π−δ1. The terminal voltage V1 is a voltage difference (S2.V−S4.V) between the voltage (S2.V) of the primary left arm lower transistor 24 and the voltage (S4.V) of the primary right arm lower transistor 28. The terminal voltage V2 is a voltage difference (S6.V−S8.V) between the voltage (S6.V) of the secondary left arm lower transistor 34 and the voltage (S8.V) of the secondary right arm lower transistor 38. As described above, the interphase difference γ1 of the primary electric power conversion circuit 20 and the interphase difference γ2 of the secondary electric power conversion circuit 30 are respectively set in consideration of the others δ1, δ2, so the voltage waveform of the terminal voltage V1 of the primary coil and the voltage waveform of the terminal voltage V2 of the secondary coil have the same shape. Subsequently, FIG. 5 shows a state where electric power is transferred by adjusting the phase difference φ in a state where the voltage waveforms of the terminal voltages V1, V2 have the same shape. FIG. 5 is a timing chart that shows a variation in voltage and a variation in current where the abscissa axis represents time and the ordinate axis represents voltage or current value. In this way, with the electric power conversion system 8, it is possible to execute transfer control by adjusting the phase difference φ even when switching control is executed in a state where the off time δ1 and the off time δ2 have different values.

What is claimed is:

1. An electric power conversion system comprising:
    a primary electric power conversion circuit including: a left arm including a left arm upper transistor and a left arm lower transistor connected in series with each other at a left arm connection point between a positive electrode bus and a negative electrode bus; a right arm including a right arm upper transistor and a right arm lower transistor connected in series with each other at a right arm connection point between the positive electrode bus and the negative electrode bus; and a primary coil connected and arranged between the left arm connection point and the right arm connection point;
    a secondary electric power conversion circuit configured similarly to the primary electric power conversion circuit and including a secondary coil corresponding to the primary coil; and
    a control circuit configured to control transfer of electric power between the primary electric power conversion circuit and the secondary electric power conversion circuit by magnetically coupling the primary coil to the secondary coil, wherein
    the control circuit is configured to set an interphase difference in switching between the left arm lower transistor and the right arm lower transistor in the primary electric power conversion circuit and an interphase difference in switching between the left arm lower transistor and the right arm lower transistor in the secondary electric power conversion circuit, on the basis of an off time of the primary electric power conversion circuit and an off time of the secondary electric power conversion circuit, such that a phase difference between a terminal voltage waveform of the primary coil and a terminal voltage waveform of the secondary coil is 0 and duty ratios of the terminal voltage waveforms are equal to each other, when the off time of each left arm lower transistor is equal to the off time of a corresponding one of the right arm lower transistors and the off time of the primary electric power conversion circuit is different from the off time of the secondary electric power conversion circuit.

2. The electric power conversion system according to claim 1, wherein
    the control circuit is configured to set the interphase difference in switching between the left arm lower transistor and the right arm lower transistor in the primary electric power conversion circuit on the basis of the off time of the secondary electric power conversion circuit, and
    the control circuit is configured to set the interphase difference in switching between the left arm lower transistor and the right arm lower transistor in the secondary electric power conversion circuit on the basis of the off time of the primary electric power conversion circuit.

3. The electric power conversion system according to claim 1, wherein
    the control circuit is configured to obtain the interphase difference in switching between the left arm lower transistor and the right arm lower transistor in the primary electric power conversion circuit by subtracting the off time of the secondary electric power conversion circuit from one period, and
    the control circuit is configured to obtain the interphase difference in switching between the left arm lower transistor and the right arm lower transistor in the secondary electric power conversion circuit by subtracting the off time of the primary electric power conversion circuit from the one period.

4. The electric power conversion system according to claim 3, wherein
    the control circuit is configured to obtain the interphase difference in switching between the left arm lower transistor and the right arm lower transistor in the primary electric power conversion circuit and the interphase difference in switching between the left arm lower transistor and the right arm lower transistor in the secondary electric power conversion circuit in consideration of a variation in the off time of the primary electric power conversion circuit and a variation in the off time of the secondary electric power conversion circuit when the off time of at least one of the primary electric power conversion circuit and the secondary electric power conversion circuit has varied due to an operating situation of a load connected to the at least one of the primary electric power conversion circuit and the secondary electric power conversion circuit.

* * * * *